United States Patent
Hu et al.

(10) Patent No.: US 10,645,542 B2
(45) Date of Patent: *May 5, 2020

(54) METHOD AND APPARATUS FOR MANAGING SHORT MESSAGE

(71) Applicant: TENCENT TECHNOLOGY (SHENZHEN) COMPANY LIMITED, Shenzhen (CN)

(72) Inventors: Yuanhan Hu, Shenzhen (CN); Wei Yi, Shenzhen (CN); Kaiyuan Lv, Shenzhen (CN); Jing He, Shenzhen (CN); Bin Li, Shenzhen (CN)

(73) Assignee: TECENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 36 days.

This patent is subject to a terminal disclaimer.

(21) Appl. No.: 16/214,747

(22) Filed: Dec. 10, 2018

(65) Prior Publication Data

US 2019/0110167 A1    Apr. 11, 2019

Related U.S. Application Data

(63) Continuation of application No. 15/165,285, filed on May 26, 2016, now Pat. No. 10,194,286, which is a (Continued)

(30) Foreign Application Priority Data

Nov. 29, 2013    (CN) .......................... 2013 1 0634010

(51) Int. Cl.
H04W 4/14    (2009.01)
H04M 1/725    (2006.01)
(Continued)

(52) U.S. Cl.
CPC ............. *H04W 4/14* (2013.01); *H04L 67/142* (2013.01); *H04M 1/72572* (2013.01); *H04W 12/08* (2013.01)

(58) Field of Classification Search
CPC .... H04M 1/66; H04M 1/673; H04M 1/72552; H04M 1/72572; H04W 12/02;
(Continued)

(56) References Cited

U.S. PATENT DOCUMENTS 5,805,707 A    9/1998    Nakano
2007/0156886 A1    7/2007    Srivastava
(Continued)

FOREIGN PATENT DOCUMENTS

CN    1708160 A    12/2005
CN    1738453 A    2/2006
(Continued)

OTHER PUBLICATIONS

The State Intellectual Property Office of the People's Republic of China (SIPO) Office Action 3 for 201310634010.6, dated Jul. 10, 2018 6 Pages (including translation).
(Continued)

*Primary Examiner* — Quoc Thai N Vu
(74) *Attorney, Agent, or Firm* — Anova Law Group, PLLC

(57) ABSTRACT

It is determined whether a short message locked. The short message is in a locked short message storage area if it is determined that the short message locked. A locked short message session containing the short message is displayed in a short message display interface. The short message display interface displays the locked short message session and an unlocked short message session containing another short message stored in an unlocked short message storage area.
(Continued)

The locked short message storage area is different from the unlocked short message storage area.

20 Claims, 11 Drawing Sheets

Related U.S. Application Data continuation of application No. PCT/CN2014/090678, filed on Nov. 10, 2014.

(51) Int. Cl.
*H04L 29/08* (2006.01)
*H04W 12/08* (2009.01)

(58) Field of Classification Search
CPC ......... H04W 12/08; H04W 4/12; H04W 4/14; H04L 67/142
See application file for complete search history.

(56) References Cited

U.S. PATENT DOCUMENTS

| | | | | |
|---|---|---|---|---|
| 2010/0162388 | A1* | 6/2010 | Baugher | G06F 21/6245 726/19 |
| 2010/0275032 | A1* | 10/2010 | Bhangi | G06F 21/34 713/182 |
| 2013/0156167 | A1* | 6/2013 | Talwar | H04M 3/53333 379/88.12 |
| 2014/0040769 | A1 | 2/2014 | Lazaridis et al. | |
| 2014/0047358 | A1* | 2/2014 | Park | H04M 1/72552 715/758 |
| 2015/0195709 | A1 | 7/2015 | Hilz | |

FOREIGN PATENT DOCUMENTS

| | | |
|---|---|---|
| CN | 101170766 A | 4/2008 |
| CN | 101198110 A | 6/2008 |
| CN | 101252748 A | 8/2008 |
| CN | 101321332 A | 12/2008 |
| CN | 102202297 A | 9/2011 |
| CN | 102223447 A | 10/2011 |
| CN | 102413230 A | 4/2012 |
| CN | 102685291 A | 9/2012 |
| WO | 2012097898 A1 | 7/2012 |

OTHER PUBLICATIONS

The State Intellectual Property Office of the People's Republic of China (SIPO) Office Action 2 for 201310634010.6, dated Feb. 1, 2018 10 Pages (including translation).

Chinese Office Action for Application No. 20131406340106 dated Aug. 1, 2017, and an English concise explanation of relevance thereof.

International Preliminary Report for Application No. PCT/CN2014/090678 dated Jun. 9, 2016.

International Search Report for Application No. PCT/CN2014/090678, dated Jan. 30, 2015.

* cited by examiner

METHOD AND APPARATUS FOR MANAGING SHORT MESSAGE

CROSS-REFERENCE TO RELATED APPLICATIONS

This application is a continuation application of U.S. patent application Ser. No. 15/165,285, filed on May 26, 2016, and now U.S. Pat. No. 10,194,286 issued on Jan. 29, 2019. U.S. patent application Ser. No. 15/165,285 (now issued as U.S. Pat. No. 10,194,286 issued on Jan. 29, 2019) is a continuation application of International Application No. PCT/CN2014/090678, filed Nov. 10, 2014, which claims the benefit and priority to Chinese Application No. 201310634010.6, filed Nov. 29, 2013. The entire disclosures of each of the above applications are incorporated herein by reference.

FIELD

The present disclosure relates to computer techniques and to a method and apparatus for managing a short message.

BACKGROUND

This section provides background information related to the present disclosure which is not necessarily prior art.

With the development of information technology, more and more users send short messages using terminals. Some short messages may include private information of a user. Therefore, in order to protect user's privacy, some short messages are locked. As such, there are two kinds of short messages, locked short messages and unlocked short messages. It is important to manage different kinds of short messages to improve user's experience.

SUMMARY

This section provides a general summary of the disclosure, and is not a comprehensive disclosure of its full scope or all of its features.

According to various embodiments of the present disclosure, a method for managing a short message is provided. The method includes:
   determining whether a short message should be locked;
   storing the short message in a locked short message storage area in response to determining that the short message should be locked; and
   displaying a locked short message session containing the short message in a short message displaying interface, wherein the short message displaying interface is used for displaying the locked short message session and an unlocked short message session containing another short message stored in an unlocked short message storage area. The locked short message storage area is different from the unlocked short message storage area.

According to various embodiments of the present disclosure, an apparatus for managing a short message is provided. The apparatus includes:
   a processor; and
   a non-transitory machine-readable storage medium storing instructions which are executable by the processor to:
   determine whether a short message should be locked;
   store the short message in a locked short message storage area in response to determining that the short message should be locked; and
   display a locked short message session containing the short message in a short message displaying interface, wherein the short message displaying interface is used for displaying the locked short message session and an unlocked short message session containing another short message stored in an unlocked short message storage area. The locked short message storage area is different from the unlocked short message storage area.

According to various embodiments of the present disclosure, a non-transitory computer-readable storage medium comprising a set of instructions for managing a short message is provided, the set of instructions to direct a processor to perform acts of:
   determining whether a short message should be locked;
   storing the short message in a locked short message storage area in response to determining that the short message should be locked; and
   displaying a locked short message session containing the short message in a short message displaying interface; wherein the short message displaying interface is used for displaying the locked short message session and an unlocked short message session containing another short message stored in an unlocked short message storage area. The locked short message storage area is different from the unlocked short message storage area.

Other aspects or embodiments of the present disclosure can be understood by those skilled in the art in light of the description, the claims, and the drawings of the present disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Features of the present disclosure are illustrated by way of example and not limited in the following figures, in which like numerals indicate like elements, in which.

Corresponding reference numerals indicate corresponding parts throughout the several views of the drawings.

DETAILED DESCRIPTION

Example embodiments will now be described more fully with reference to the accompanying drawings.

The preset disclosure will be described in further detail hereinafter with reference to accompanying drawings and examples to make the technical method and merits therein clearer.

For simplicity and illustrative purposes, the present disclosure is described by referring to examples. In the following description, numerous details are set forth in order to provide a thorough understanding of the present disclosure. It will be readily apparent however, that the present disclosure may be practiced without limitation to these details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
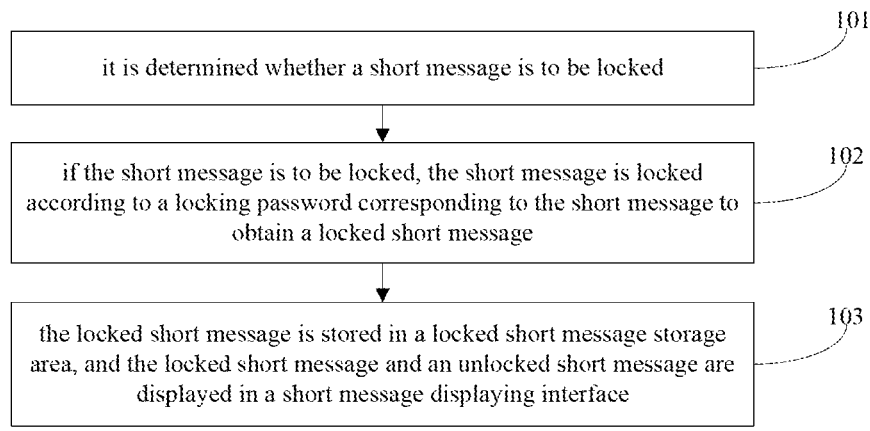
FIG. 1 shows an example of a method for managing a short message according to various embodiments.

FIG. 1 shows an example of a method for managing a short message according to various embodiments of the present disclosure. As shown in FIG. 1, the method includes the following.

Block 101: It is determined whether a short message should be locked.

Block 102: If the short message should be locked, the short message is locked according to a locking password corresponding to the short message to obtain a locked short message.

Block 103: The locked short message is stored in a locked short message storage area, and the locked short message and an unlocked short message are displayed in a short message displaying interface, wherein the unlocked short message is stored in an unlocked short message storage area.

According to various embodiments, the short message to be locked may be a newly received short message. At this time, the short message is received from a short message server and is then taken as the short message to be locked. According to various embodiments, the short message to be locked may be a short message stored in the unlocked short message storage area. At this time, after the short message is stored in the locked short message storage area, the method may further delete the short message from the unlocked short message storage area. According to various embodiments, determining whether the short message should be locked may include comparing a sender number of the short message with a preconfigured locking number. If the sender number matches with the preconfigured locking number, it is determined that the short message should be locked.

According to various embodiments, before locking the short message according to the locking password corresponding to the short message to be locked, the locking number and the locking password corresponding to the locking number are configured and stored in advance. According to various embodiments, before displaying the locked short message in the short message displaying interface, the method may further include determining a short message session corresponding to a number of the short message and adding the locked short message to the short message session to obtain an updated short message session, wherein different numbers correspond to different short message sessions. The updated short message session is added to a short message list containing an unlocked short message in the unlocked short message storage area. Displaying the locked short message and the unlocked short message in the unlocked short message displaying interface includes displaying the short message list containing the updated short message session, and displaying a locking identifier corresponding to the updated short message session.

After the locked short message and the unlocked short message are displayed in the short message displaying interface, the method may further include:

obtaining a displaying instruction for displaying the locked short message, popping out a password inputting box according to the displaying instruction;

obtaining a password input in the password input box, comparing the input password with the preconfigured locking password corresponding to the locked short message; and if they match, obtaining and displaying details of the locked short message.

After the locked short message is stored in the locked short message storage area, the method may further include:

obtaining an unlocking instruction for unlocking the locked short message, deleting the locked short message from the locked short message storage area, and unlocking the locked short message according to the locking password corresponding to the locked short message to obtain an unlocked short message; and storing the unlocked short message in the unlocked short message storage area.

According to various embodiments, a locking password is added to the short message to be locked. The locked short message is displayed in the short message displaying interface together with unlocked short messages. Thus, the user is not required to find the locked short message in a deep interface. The method provided by the example facilitates the management of the short message.

Figure 2:
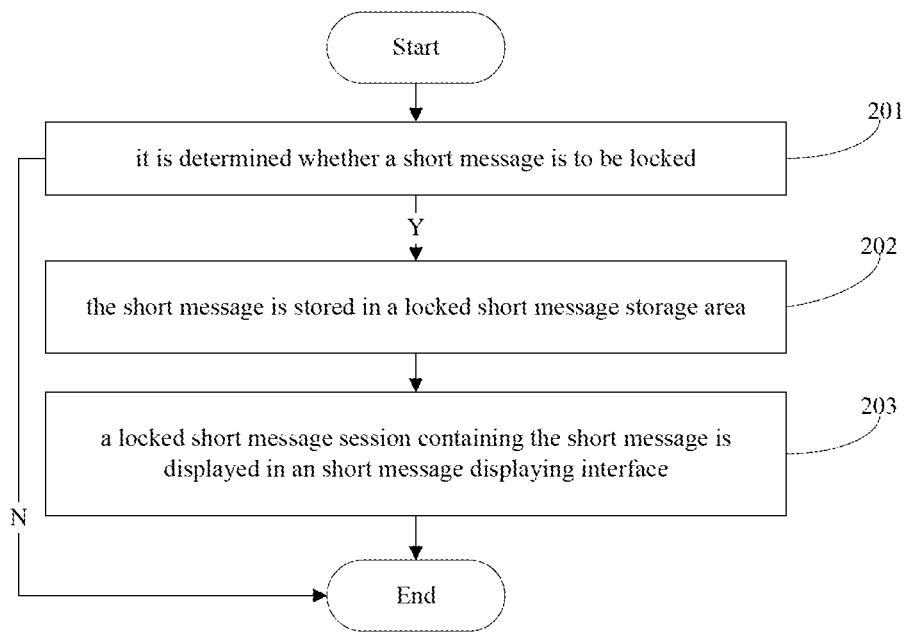
FIG. 2 shows another example of the method for managing a short message according to various embodiments.

FIG. 2 shows another example of a method for managing a short message according to various embodiments of the present disclosure. As shown in FIG. 2, the method includes the following.

Block 201: It is determined whether a short message should be locked.

Block 202: If the short message should be locked, the short message is stored in a locked short message storage area.

Block 203: A locked short message session containing the short message is displayed in a short message displaying interface, wherein the short message displaying interface is used for displaying the locked short message session and an unlocked short message session containing another short message stored in an unlocked short message storage area. The locked short message storage area is different from the unlocked short message storage area.

According to various embodiments, the short message to be locked may be a newly received short message. At this time, the short message is received from a short message server and then is stored in the locked short message storage area. According to various embodiments, the short message to be locked may be a short message stored in the unlocked short message storage area. At this time, after the locked short message is stored in the locked short message storage area, the method may further delete the short message from the unlocked short message storage area. According to various embodiments, the short message to be locked may be a short message newly sent by the user. At this time, the newly-sent short message is stored in the locked short message storage area.

According to various embodiments, determining whether the short message should be locked may include:

comparing a sender number of the short message with a preconfigured number, and, if the sender number matches with the preconfigured number, determining that the short message should be locked; or comparing a receiver number of the short message with a preconfigured number, and, if the receiver number matches with the preconfigured number, determining that the short message should be locked.

According to various embodiments, a locking number and a locking password corresponding to the locking number are configured and stored in advance. According to various embodiments, before displaying the short message session containing the short message in the short message displaying interface, the method may further include determining the short message session corresponding to the short message, adding the short message to the short message session.

Displaying the locked short message session containing the short message in the short message displaying interface includes:

displaying a sender corresponding to the locked short message session and a receiving time of a latest short message in the locked short message session; or displaying a receiver corresponding to locked short message session and a sending time of a latest short message in the locked short message session.

Figure 3:
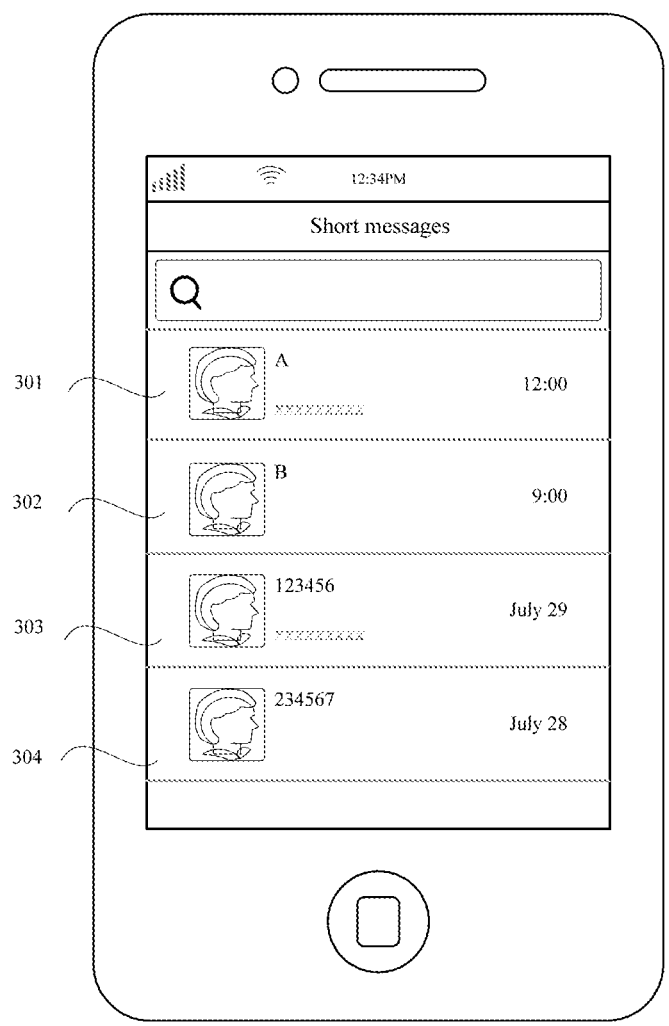
FIG. 3 shows an example of a short message displaying interface according to various embodiments.

The locked short message session is displayed differently from an unlocked short message session. In particular, for the locked short message session containing a short message sent by a locking number, merely the sender and the receiving time of the short message are displayed. For example, as shown in FIG. 3, short message sessions 301~304 are displayed, wherein short message sessions 301 and 303 are unlocked short message sessions and short message sessions 302 and 304 are locked short message sessions. For the locked short message session, merely name/telephone number of the sender, avatar of the sender, and the receiving time of the latest short message in the locked short message session are displayed. For the locked short message session 302, the sender name is B and the receiving time of a latest short message sent by B is 9:00. For the unlocked short message session, however, in addition to the sender and the receiving time, an abstract of a latest short message in the unlocked short message session is further displayed. As shown in 301 and 303 in FIG. 3, the abstract is denoted by "xxxxxxx".

According to various embodiments, after displaying the locked short message in the short message displaying interface, the method further includes:

obtaining a displaying instruction for displaying the locked short message in the locked short message session, and displaying a password input area in response to the displaying instruction;

obtaining a password input in the password input area, comparing the password with the preconfigured password according to the locked short message; and if they match, obtaining and displaying the locked short message in the locked short message session.

According to various embodiments, after the short message is stored in the locked short message storage area, the method may further include:

obtaining an unlocking instruction for unlocking the short message in the locked short message session; and storing the short message in the unlocked short message storage area and deleting the short message from the locked short message storage area.

Figure 4:
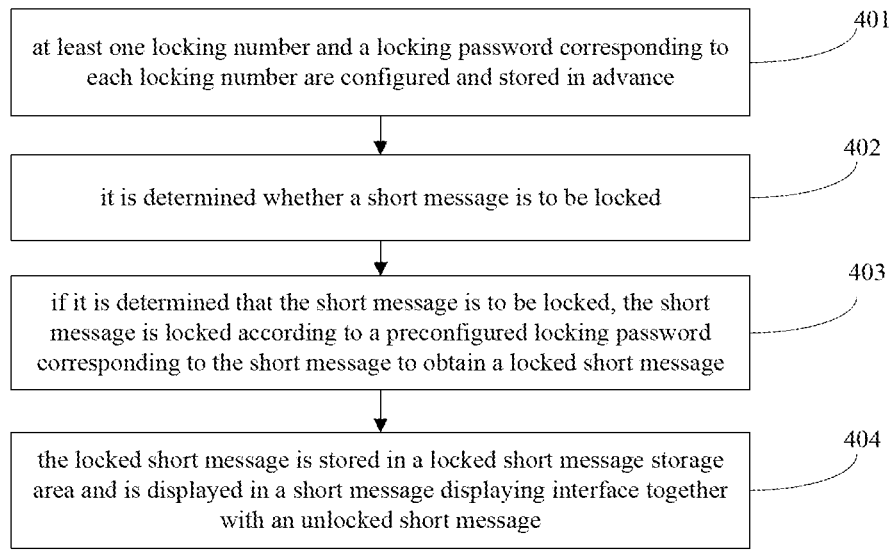
FIG. 4 shows an example of a method for managing a short message according to various embodiments.

FIG. 4 shows another example of a method for managing a short message according to various embodiments of the present disclosure. As shown in FIG. 4, the method includes the following.

Block 401: At least one locking number and a locking password corresponding to each locking number are configured and stored in advance. In this block, in order to manage short messages, a locking number is configured in advance. The present disclosure does not restrict the manner for configuring the locking number. For example, a configuring interface may be provided to the user. The user configures a telephone number as the locking number. The terminal detects the configuration of the user on the configuring interface, obtains the telephone number configured by the user, and configures the telephone number as the locking number.

In order to protect user's privacy, after the locking number is configured, a locking password corresponding to the locking number is configured. The configuration manner of the locking password is also not restricted in the present disclosure. The user may configure the same locking password for several locking numbers or configure a unique locking password for each locking number.

Suppose that the locking numbers configured by the user include 123456, 234567, and 345678. The locking password corresponding to the locking number 123456 is "xyz". The locking password corresponding to the locking number 234567 is "abc". The locking password corresponding to the locking number 345678 is "mno". Alternatively, the locking numbers 123456, 234567 and 345678 may be configured with the same locking password, e.g. "fgh".

In this block, the locking number and the locking password corresponding to the locking number are configured in advance. Therefore, after the locking number and the locking password are configured, the locking number and the locking password are stored. The storing manner of the locking number and the locking password are not restricted in the present disclosure.

Block 401 may be not performed each time a short message is managed. Thereafter, the locking number and the locking password corresponding to the locking number may be directly utilized to manage short messages. When the locking number or the locking password should be updated, block 401 may be performed again.

Block 402: It is determined whether a short message should be locked. In this block, the short message may be, but is not limited to, a short message stored in an unlocked short message storage area, or a newly-received short message. For the short message stored in the unlocked short message storage area, the short message may be selected from the unlocked short message storage area and then a determination is made on whether to lock the selected short message. For the newly-received short message, a determination is made on whether to lock the newly-received short message.

For the newly-received short message, the determination on whether to lock the short message may include the following:

comparing a sender number of the newly-received short message with the preconfigured locking number; and if the sender number of the newly-received short message matches with the preconfigured locking number, determining that the newly-received short message should be locked.

Suppose that there are three newly-received short messages, short message 1, short message 2 and short message 3. The sender number of the short message 1 is 123456, the sender number of the short message 2 is 234567 and the sender number of the short message 3 is 345678. The preconfigured locking numbers include 123456 and 234567. The sender numbers of the short messages 1, 2, and 3 are compared with the preconfigured locking numbers. Since the sender number 123456 of the short message 1 matches with the preconfigured locking number 123456, it is determined to lock the short message 1. Since the sender number 234567 of the short message 2 matches with the preconfigured locking number 234567, it is determined to lock the short message 2. Since the sender number 345678 of the short message 3 does not match with any preconfigured number, the short message 3 is not locked.

After a new short message is received, in order to facilitate the management of the new short message, various embodiments of the present disclosure include a process of storing the new short message. The storing manner of the new short message is not restricted in the present disclosure. Two example storing manners are described hereinafter.

In a first manner, the new short message is stored in the unlocked short message storage area. If it is determined that the new short message in the unlocked short message storage area needs to be locked, this new short message is moved to the locked short message storage area from the unlocked short message storage area.

In a second manner, after a new short message is received, if the new short message is not to be locked, the new short message is stored in the unlocked short message storage area. If the new short message should be locked, the new short message is stored in the locked short message storage area.

In the case that the short message to be locked is a short message stored in the unlocked short message storage area, various embodiments of the present disclosure provide an option for locking the short message. If the user desires to lock the short message, the user may select the option to lock the short message. After detecting selection of the option by the user, the selected short message is taken as a short message to be locked.

Block 403: If it is determined that the short message should be locked, the short message is locked according to the preconfigured locking password corresponding to the short message to obtain a locked short message. In this block, since the locking password has been configured corresponding to each locking number in block 401, once it is determined that a short message should be locked, block 403 may lock the short message according to the locking password corresponding to the short message to obtain the locked short message.

Block 404: The locked short message is stored in a locked short message storage area and is displayed in a short message displaying interface together with an unlocked short message.

After a short message is locked, the locked short message and the unlocked short message need to be stored in different areas for facilitating management of the locked short message and the unlocked short message. The present disclosure does not restrict the detailed positions that the locked short message and the unlocked short message are stored, if only the locked short message storage area and the unlocked short message storage area are different.

In the case that the short message to be locked is a newly-received short message, if the new short message needs to be locked, the short message is locked and the locked short message is stored in the locked short message storage area. In the case that the short message to be locked is an unlocked short message stored in the unlocked short message storage area, the short message is stored in the locked short message storage area after being locked. The short message is then deleted from the unlocked short message storage area, so as to avoid that the same short message is saved as both a locked short message and an unlocked short message.

Further, after the locked short message is stored in the locked short message storage area, the locked short message is displayed in the short message displaying interface to facilitate viewing and managing of the locked short message. Since the locked short message storage area may store more than one locked short message, it is inconvenient for the user to directly display the locked short messages in the short message displaying interface. Therefore, before displaying the locked short message and the unlocked short message in the unlocked short message storage area, the short message session corresponding to the locked short message is determined, so as to display the locked short messages sent by the same locking number in one locked short message session. In order to differentiate the locked short messages sent by different locking numbers, the locked short message sessions corresponding to different locking numbers are different. The short message session may be a displaying item in the short message displaying interface. The short message displaying interface may include multiple short message sessions, and each short message session includes all short messages sent by one number. If one short message session is selected, all short messages included in the selected short message session may be displayed.

In order to differentiate the locked short message and the unlocked short message displayed in the short message displaying interface, various embodiments of the present disclosure further include some pre-processing before displaying the unlocked short message in the short message displaying interface. The pre-processing includes the following:

the locked short message session corresponding to the sender number of the locked short message is determined, adding the locked short message to the determined locked short message session to obtain an updated locked short message session, wherein different numbers correspond to different locked short message sessions; and displaying the updated locked short message session in the short message displaying interface.

Suppose that there are 5 locked short messages stored in the locked short message storage area, respectively, locked short messages 1, 2, 3, 4, and 5. The locked short message 1 corresponds to locking number 123456, the locked short message 2 corresponds to locking number 234567, the locked short message 3 corresponds to locking number 234567, the locked short message 4 corresponds to locking number 123456, and the locked short message 5 corresponds to locking number 234567. When the above locked short messages are added into the locked short message sessions which may contain other locked short messages in the locked short message storage area, locked short messages 1 and 4 are added to the same locked short message session since both of them correspond to the locking number 123456. The locked short messages 2, 3, and 5 are added to the same locked short message session since both of them correspond to the locking number 234567.

After the above pre-processing, the locked short message may be displayed in the short message displaying interface.

According to various embodiments, the updated locked short message session is displayed in the short message displaying interface. The short message displaying interface may further contain an unlocked short message session. In order to facilitate the user to differentiate the locked short message and the unlocked short message, a locking identifier corresponding to the locked short message session may be displayed.

The short message displaying interface includes the updated locked short message session and may also include an unlocked short message session. When displayed, the locked short message session and the unlocked short message session are sorted according to sending/receiving time of a latest short message of each. The unlocked short message session and the locked short message session are then displayed in the short message displaying interface according to a sorted result.

Hereinafter the above procedure is described with reference to various embodiments.

Figure 5:
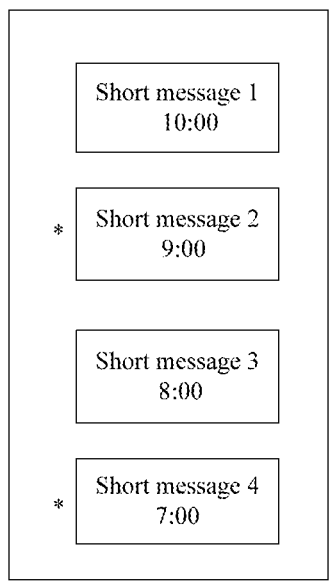
FIG. 5 shows an example of a short message displaying interface according to various embodiments.

As shown in FIG. 5, the short message session with a star is a locked short message session. The short message session without a star is an unlocked short message session. It can be seen from FIG. 5 that the receiving time of a latest short message in the short message session "short message 1" is 10:00. The receiving time of a latest short message in the short message session "short message 2" is 9:00. The receiving time of a latest short message in the short message session "short message 3" is 8:00. The receiving time of a latest short message in the short message session "short message 4" is 7:00. Therefore, in the short message displaying interface as shown in FIG. 5, the sequence of the short message sessions is as follows: "short message 1", "short message 2", "short message 3", "short message 4".

Further, after the locked short message is stored in the locked short message storage area and is displayed in the short message displaying interface, various embodiments of the present disclosure further provide an operation of displaying details of the locked short message, such that the user can view the locked short message. According to various embodiments, the details of the locked short message may be displayed via a following manner.

In a first process, a displaying instruction for displaying a locked short message is obtained.

The present disclosure is not intended to restrict the manner for obtaining the displaying instruction. For example, the user may select a locked short message to view. A terminal of the user obtains the displaying instruction for displaying the locked short message selected by the user according to the user's selection operation.

In a second process, a password input box is displayed in response to the displaying instruction.

After obtaining the displaying instruction, the terminal prompts a password input box, such that the user may input the corresponding password in the password input box.

In a third process, the password input in the password input box is obtained and is compared with a preconfigured password corresponding to the locked short message.

In a fourth process, if the input password matches with the preconfigured password corresponding to the locked short message, details of the locked short message are obtained and displayed.

An example is given hereinafter to describe the above procedure.

Figure 6:
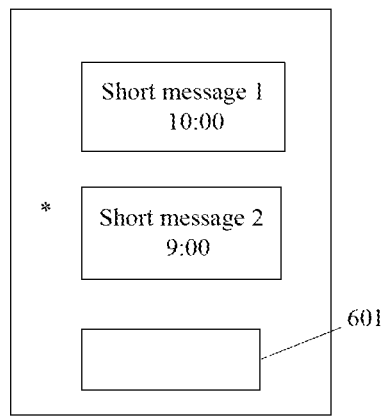
FIG. 6 shows an example of a displaying interface of a locked short message according to various embodiments.

As shown in FIG. 6, short message 1 is an unlocked short message and short message 2 is a locked short message. If the user selects the locked short message 2, the terminal detects the user's selection operation and prompts a password input box 601. The user inputs the password in the password input box 601. If it is determined that the input password matches with the preconfigured password, the terminal displays the details of the locked short message.

Through the above, the user is able to view the details of the locked short message. However, the next time the user wants to view the details of the locked short message, the password has to be input again.

Various embodiments of the present disclosure further include an unlocking process, such that the user is not required to input the password again.

The unlocking of the short message may be implemented via a following manner.

In a first process, an unlocking instruction for unlocking a locked short message is obtained, the locked short message is deleted from the locked short message storage area, and the locked short message is unlocked according to a corresponding locking password to obtain an unlocked short message.

According to various embodiments, an unlocking interface may be provided. The user selects a locked short message on the unlocking interface to generate the unlocking instruction. After detecting the unlocking operation of the user, the terminal obtains the unlocking instruction. In addition, the user may also remove a locking number on a configuration interface, such that all short messages sent by this number are unlocked. Thereafter, the short message sent by this number is stored in the unlocked short message storage area as an unlocked short message.

In a second process, the unlocked short message is stored in the unlocked short message storage area.

Figure 7:
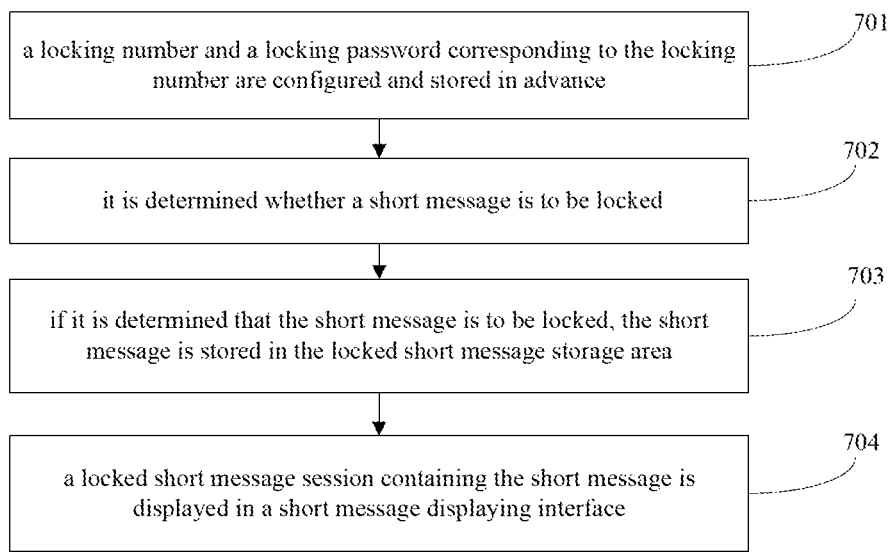
FIG. 7 shows an example of a method for managing a short message according to various embodiments.

FIG. 7 shows an example of a method for managing a short message according to various embodiments of the present disclosure. As shown in FIG. 7, the method includes the following.

Block 701: A locking number and a locking password corresponding to the locking number are configured and stored in advance. This block is similar to block 401 and is not repeated herein.

Block 702: It is determined whether a short message should be locked. In this block, the short message may be, but is not limited to, a short message stored in an unlocked short message storage area, or a newly-received short message or a newly-sent short message. For the short message stored in the unlocked short message storage area, the short message may be selected from the unlocked short message storage area and then a determination is made on whether the selected short message should be locked. For the newly-received short message, a determination is made on whether the newly-received short message should be locked.

For the newly-received short message, the determination on whether the short message should be locked may include the following:

comparing a sender number of the newly-received short message with the preconfigured locking number; and if the sender number of the newly-received short message matches with the preconfigured locking number, determining that the newly-received short message should be locked.

For the newly-sent short message, the determination on whether the short message should be locked may include the following:

comparing a receiver number of the newly-sent short message with the preconfigured locking number; and if the receiver number of the newly-sent short message matches with the preconfigured locking number, determining that the newly-sent short message should be locked.

Block 703: If it is determined that the short message should be locked, the short message is stored in the locked short message storage area. In this block, since a locking password has been configured corresponding to each locking number in block 701, once it is determined that a short message should be locked, block 703 may store the short message in the locked short message storage area.

Block 704: A locked short message session containing the short message is displayed in a short message displaying interface. The locked short message session corresponding to the sender number or receiver number of the locked short message is determined and the short message is added to the determined locked short message session to obtain an updated locked short message session, wherein different numbers correspond to different locked short message sessions. The updated locked short message session is displayed in the short message displaying interface.

Further, after the locked short message session containing the short message is displayed in the short message displaying interface, various embodiments of the present disclosure further provide an operation of displaying details of the locked short message session, i.e., displaying the short message in the locked short message session, such that the user can view the contents of the short message in the locked short message session. According to various embodiments, the details of the locked short message may be displayed via the following manner.

In a first process, a displaying instruction for displaying the details of the locked short message session is obtained.

The present disclosure is not intended to restrict the manner for obtaining the displaying instruction. For example, the user may select a locked short message session to view. A terminal of the user obtains the displaying instruction for displaying the locked short message session selected by the user according to the user's selection operation.

In a second process, a password input area is displayed in response to the displaying instruction.

After obtaining the displaying instruction, the terminal provides a password input area to the user, such that the user may input corresponding password in the password input area. The password input area may be a password input page. The user may input a gesture password in the password input page to unlock the locked short message session. The password input area may also be a password input box which enables the user to input password using a keyboard.

In a third process, the password input in the password input area is obtained and is compared with a preconfigured password corresponding to the locked short message session.

In a fourth process, if the input password matches with the preconfigured password corresponding to the locked short message session, details of the locked short message session are obtained and displayed.

Through the above, the user is able to view the details of the locked short message session.

Various embodiments of the present disclosure further include a process of removing a locking number, such that a short message received from or sent to the locking number is not stored in the locked short message storage area any more.

In a first process, an unlocking instruction for removing a locking number is obtained and the locking number is deleted from a list of locking numbers. According to various embodiments, an unlocking interface may be provided. The user selects a locking number on the unlocking interface to generate the unlocking instruction. After detecting the unlocking operation of the user, the terminal obtains the unlocking instruction and is removed from the list of locking numbers.

In a second process, the short message corresponding to the locking number is stored in the unlocked short message storage area and is deleted from the locked short message storage area. Thereafter, the short message received from or sent to this number is stored in the unlocked short message storage area as an unlocked short message.

Figure 8:
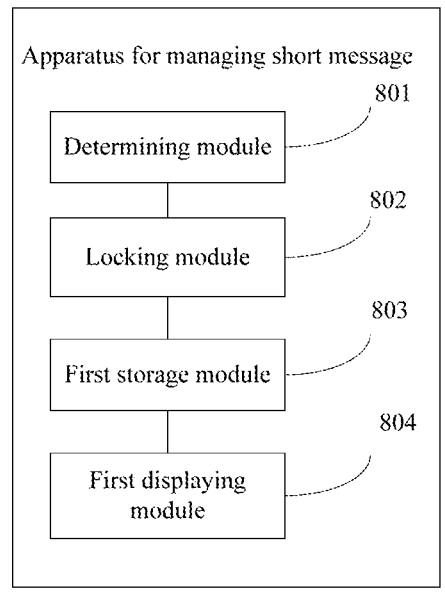
FIG. 8 shows an example of an apparatus for managing a short message according to various embodiments.

FIG. 8 shows an example of an apparatus for managing a short message according to various embodiments of the present disclosure. The apparatus includes:

a determining module 801, to determine whether to lock a short message;

a locking module 802, to lock the short message according to a preconfigured locking password corresponding to the short message in response to determining that the short message should be locked, so as to obtain a locked short message;

a first storage module 803, to store the locked short message in a locked short message storage area; and a first displaying module 804, to display the locked short message in a short message displaying interface.

Figure 9:
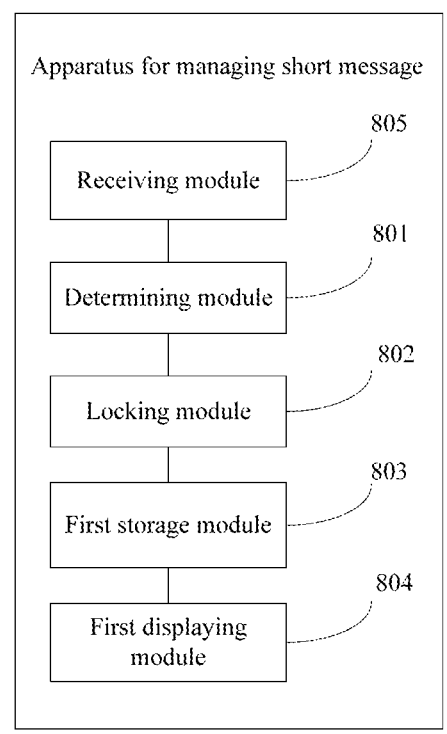
FIG. 9 shows another example of an apparatus for managing a short message according to various embodiments.

FIG. 9 shows another example of an apparatus for managing a short message according to various embodiments of the present disclosure. As shown in FIG. 9, in addition to the determining module 801, the locking module 802, the first storage module 803, and the first displaying module 804, the apparatus further includes a receiving module 805, to receive the short message from a short message server.

Figure 10:
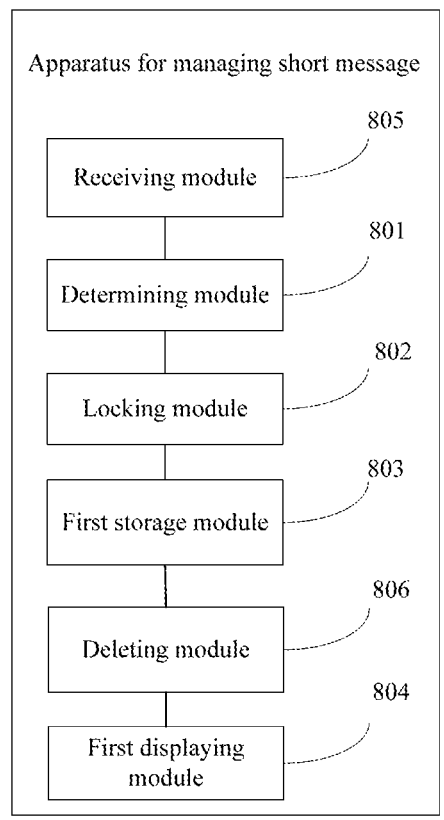
FIG. 10 shows still another example of an apparatus for managing a short message according to various embodiments.

FIG. 10 shows another example of an apparatus for managing a short message according to various embodiments of the present disclosure. As shown in FIG. 10, the apparatus further includes a deleting module 806, to delete the short message from an unlocked short message storage area.

Figure 11:
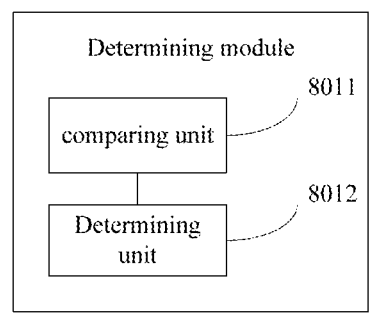
FIG. 11 shows an example of a determining module according to various embodiments.

FIG. 11 shows an example of the determining module 801 according to various embodiments of the present disclosure. As shown in FIG. 11, the determining module 801 includes:

a comparing unit 8011, to compare a sender number of the short message with a preconfigured locking number; and a determining unit 8012, to determine to lock the short message in response to determining that the sender number of the short message matches with the preconfigured locking number.

Figure 12:
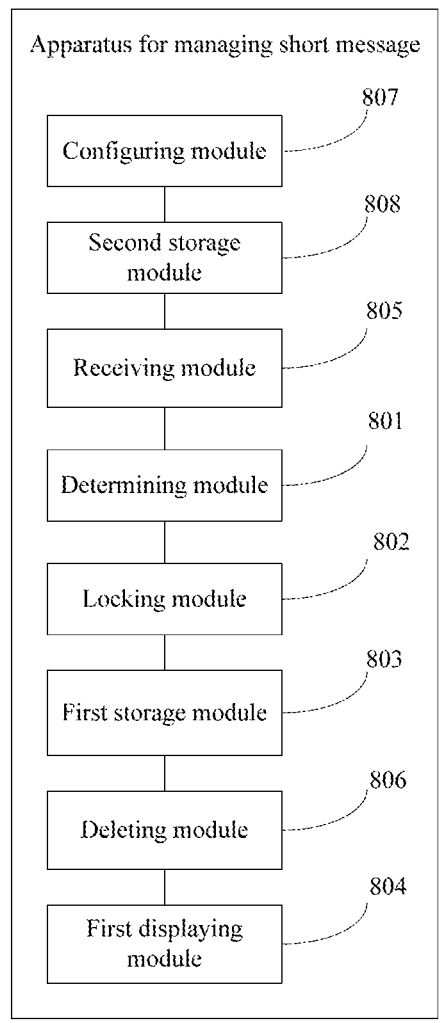
FIG. 12 shows yet another example of an apparatus for managing a short message according to various embodiments.

FIG. 12 shows another example of an apparatus for managing a short message according to various embodiments of the present disclosure. As shown in FIG. 12, the apparatus further includes:

a configuring module 807, to configure at least one locking number and a locking password corresponding to each locking number in advance; and a second storage module 808, to store the at least one locking number and the locking password corresponding to each locking number.

Figure 13:
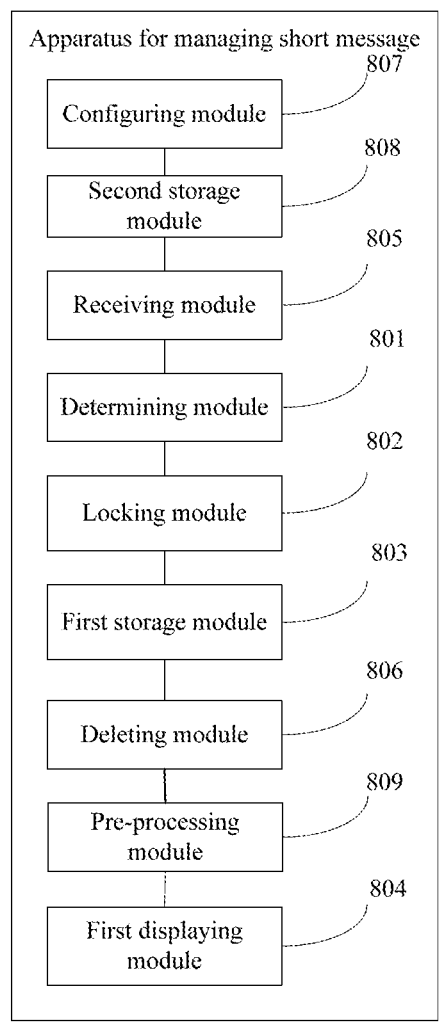
FIG. 13 shows yet another example of an apparatus for managing a short message according to various embodiments.

FIG. 13 shows another example of an apparatus for managing a short message according to various embodiments of the present disclosure. As shown in FIG. 13, the apparatus further includes:

a pre-processing module 809, to determine a short message session corresponding to a sender number of the locked short message, add the short message to the determined short message session to obtain an updated short message session, and add the updated short message session in a short message list; wherein different numbers correspond to different short message sessions; and the first displaying module 804 displays a short message list including the updated short message session in the short message displaying interface, and displays a locking identifier corresponding to the updated short message session.

Figure 14:
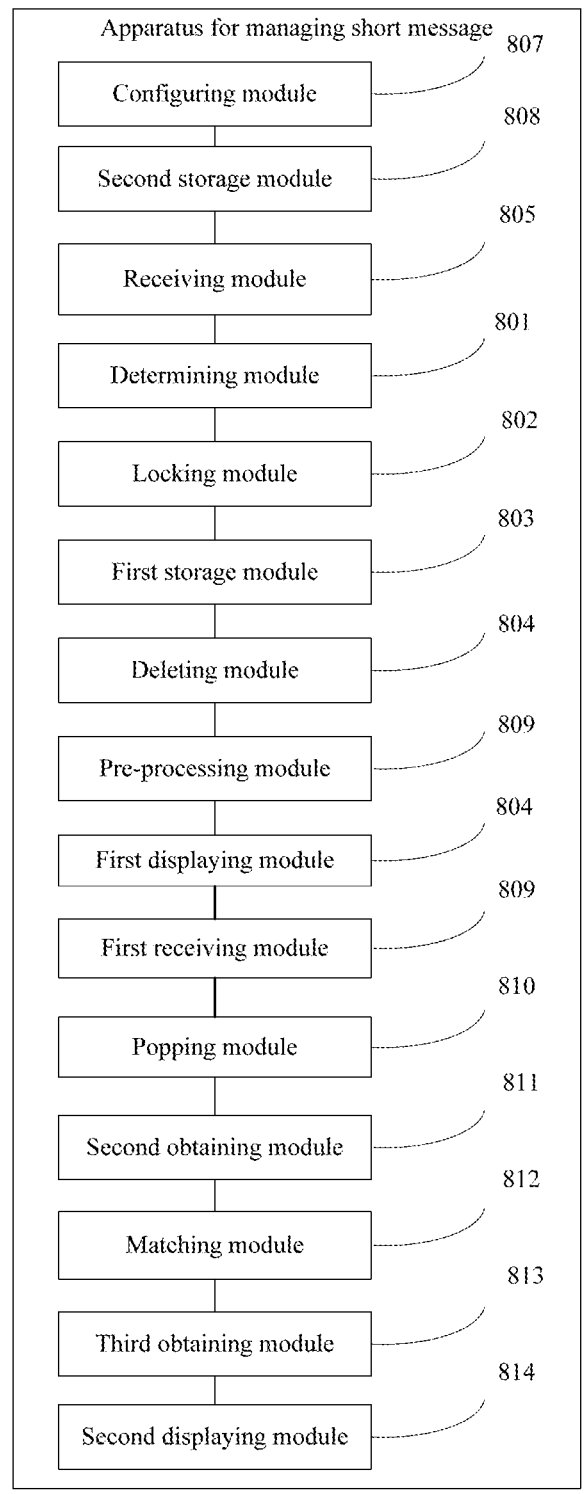
FIG. 14 shows yet another example of an apparatus for managing a short message according to various embodiments.

As shown in FIG. 14, the apparatus may further include:

a first obtaining module 810, to obtain a displaying instruction for displaying the locked short message;

a popping module 811, to pop out a password input box according to the displaying instruction;

a second obtaining module 812, to obtain a password input in the password input box;

a matching module 813, to compare the password input in the password input box with the preconfigured locking password;

a third obtaining module 814, to obtain details of the locked short message in response to determining that the password input in the password input box matches with the preconfigured locking password; and a second displaying module 815, to display the details of the locked short message.

Figure 15:
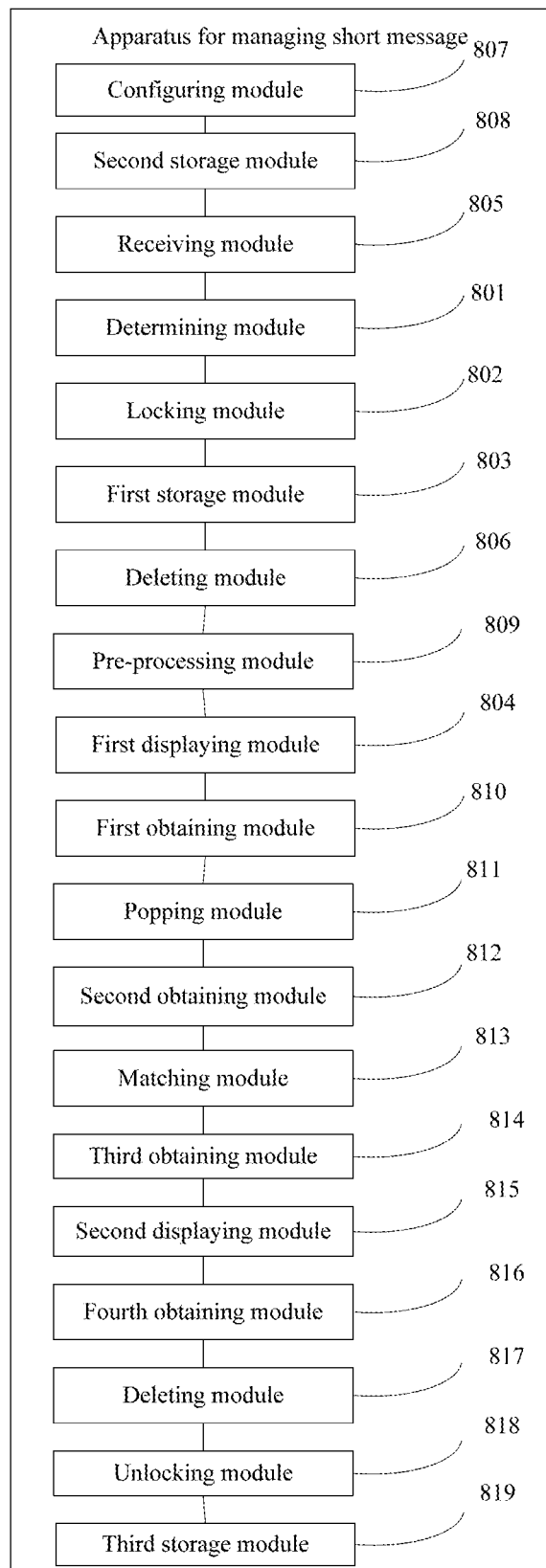
FIG. 15 shows yet another example of an apparatus for managing a short message according to various embodiments.

As shown in FIG. 15, the apparatus may further include:

a fourth obtaining module 816, to obtain an unlocking instruction for unlocking the locked short message;

a deleting module 817, to delete the locked short message from the locked short message storage area;

an unlocking module 818, to unlock the locked short message according to the unlocking instruction to obtain an unlocked short message; and a third storage module 819, to store the unlocked short message in the unlocked short message storage area.

Figure 16:
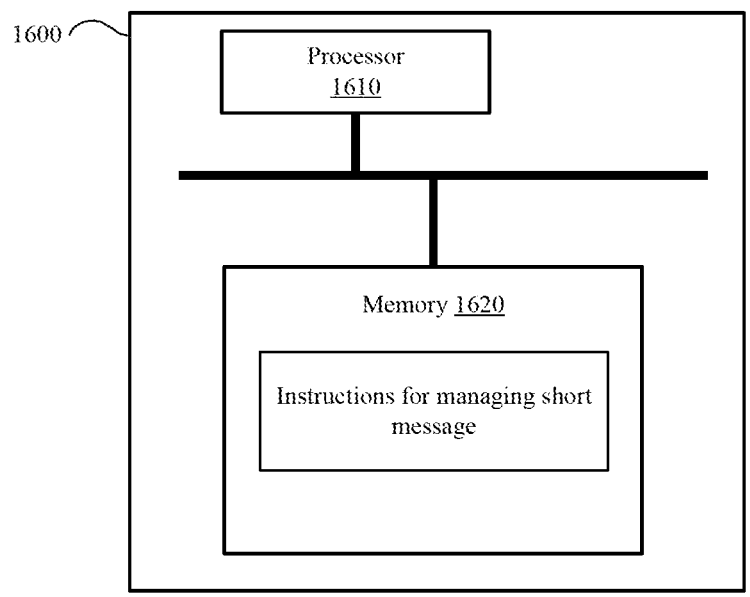
FIG. 16 shows an example of a terminal according to various embodiments.

FIG. 16 shows an example of an apparatus for managing a short message according to various embodiments of the present disclosure. The apparatus 1600 includes:

a processor 1610;

a non-transitory machine-readable storage medium 1620 storing instructions which are executable by the processor 1610 to:

determine whether a short message should be locked;

store the short message in a locked short message storage area in response to determining that the short message should be locked; and display a locked short message session containing the short message in a short message displaying interface, wherein the short message displaying interface is used for displaying the locked short message session and an unlocked short message session containing another short message stored in an unlocked short message storage area. The locked short message storage area is different from the unlocked short message storage area.

The various modules and/or functions described above may be implemented by executing the above described machine-readable instructions on a processor.

The processor in the examples of the present disclosure may include one or more processors for executing the sets of instructions stored in the memory. The processor is a hardware device, such as a central processing unit (CPU) or a micro controlling unit (MCU). The memory in the examples of the present disclosure is a non-transitory processor-readable storage media, such as a RAM memory, flash memory, ROM memory, EPROM memory, EEPROM memory, registers, hard disk, a removable disk, a CD-ROM, or any other form of non-transitory storage medium known in the art.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for managing a short message, comprising:
   determining whether a sender identification or a receiver identification of a first short message matches preconfigured locking identification-one;
   upon determining that the sender identification or the receiver identification of the first short message matches the preconfigured locking identification-one, locking the first short message to obtain a first locked short message;
   displaying, in a short message displaying interface, locked short message session-one containing the first locked short message, the locked short message session-one corresponding to the preconfigured locking identification-one;
   adding, into the locked short message session-one, a second locked short message;
   displaying, in the short message displaying interface, locked short message session-two containing a third locked short message, the locked short message session-two corresponding to preconfigured locking identification-two different from the preconfigured locking identification-one; and
   displaying, in the short message display interface, an unlocked short message session containing an unlocked short message, wherein the short message display interface shows the locked short message session-one and the locked short message session-two along with the unlocked short message session.

2. The method of claim 1, further comprising:
storing at least one of the first, second, and third locked short messages in a locked short message storage area; and
storing the unlocked short message in an unlocked short message storage area, the locked short message storage area being different from the unlocked short message storage area.

3. The method of claim 1, further comprising:
before determining whether the sender identification or the receiver identification of the first short message matches with the preconfigured locking identification-one, storing the preconfigured locking identification-one.

4. The method of claim 1, wherein the preconfigured locking identification-one corresponds to locking password-one and the preconfigured locking identification-two corresponds to locking password-two different from the locking password-one.

5. The method of claim 1, wherein the preconfigured locking identification-one corresponds to locking password-one and the preconfigured locking identification-two corresponds to locking password-two identical to the locking password-one.

6. The method of claim 1, wherein displaying the locked short message session-one comprises: sorting the first and second locked short messages according to sending time or receiving time to obtain the sorted first and second locked short messages; and
displaying the sorted first and second locked short messages included in the locked short massage session-one.

7. The method of claim 1, wherein displaying in the short message displaying interface further comprises:
sorting the locked short message session-one and session-two according to sending time or receiving time of the first, second, and third locked short messages to obtain the sorted locked short message session-one and session-two; and
displaying, in the short message displaying interface, the sorted locked short message session-one and session-two.

8. The method according to claim 1, prior to obtaining the first locked short message, further comprising:
relocating a copy of the first short message from an unlocked storage area to a locked storage area; and
deleting the first short message from the unlocked storage area.

9. The method according to claim 1, wherein one of the preconfigured locking identification-one and the preconfigured locking identification-two is a name, and the other of the preconfigured locking identification-one and the preconfigured locking identification-two is a phone number.

10. The method according to claim 1, wherein at least one of the sender identification and the receiver identification is a name or a phone number.

11. An apparatus for managing a short message, comprising: a processor; and a non-transitory machine-readable storage medium for storing instructions which are executable by the processor, wherein the processor is configured to:
determine whether a sender identification or a receiver identification of a first short message matches preconfigured locking identification-one;
upon determining that the sender identification or the receiver identification of the first short message matches the preconfigured locking identification-one, lock the first short message to obtain a locked first short message;
display, in a short message displaying interface, locked short message session-one containing the first locked short message, the locked short message session-one corresponding to the preconfigured locking identification-one;
add, into the locked short message session-one, a second locked short message;
display, in the short message displaying interface, locked short message session-two containing a third locked short message, the locked short message session-two corresponding to preconfigured locking identification-two different from the preconfigured locking identification-one; and
display, in the short message displaying interface, an unlocked short message session containing an unlocked short message, wherein the short message display interface shows the locked short message session-one and the locked short message session-two along with the unlocked short message session.

12. The apparatus of claim 11, wherein the processor is further configured to:
store at least one of the first, second, and third locked short messages in a locked short message storage area; and
store the unlocked short message in an unlocked short message storage area, the locked short message storage area being different from the unlocked short message storage area.

13. The apparatus of claim 11, wherein the processor is further configured to:
before determining whether the sender identification or the receiver identification of the first short message matches the preconfigured locking identification-one, store the preconfigured locking identification-one.

14. The apparatus of claim 13, wherein the preconfigured locking identification-one corresponds to locking password-one and the preconfigured locking identification-two corresponds to locking password-two identical to the locking password-one.

15. The apparatus of claim 11, wherein the preconfigured locking identification-one corresponds to locking password-one and the preconfigured locking identification-two corresponds to locking password-two different from the locking password-one.

16. The apparatus of claim 11, wherein the processor is further configured to:
sort the first and second locked short messages according to sending time or receiving time of the first and second locked short messages to obtain sorted first and second locked short messages; and
display the sorted first and second locked short messages in the locked short massage session-one.

17. The apparatus of claim 11, wherein the processor is further configured to:
sort the locked short message session-one and session-two according to sending time or receiving time of the first, second, and third locked short messages to obtain sorted locked short message session-one and session-two; and
display, in the short message displaying interface, the sorted locked short message session-one and session-two.

18. The apparatus according to claim 11, prior to obtaining the first locked short message, the processor is further configured to:
relocate a copy of the first short message from an unlocked storage area to a locked storage area; and
delete the first short message from the unlocked storage area.

19. A non-transitory computer-readable storage medium comprising a set of instructions for managing a short message, the set of instructions being executed to direct at least one processor to:
determine whether a sender identification or a receiver identification of a first short message matches preconfigured locking identification-one;
upon determining that the sender identification or the receiver identification of the first short message matches the preconfigured locking identification, lock the first short message to obtain a first locked short message;
display, in a short message displaying interface, locked short message session-one containing the first locked short message, the locked short message session-one corresponding to the preconfigured locking identification-one;
add, into the locked short message session-one, a second locked short message;
display, in the short message displaying interface, locked short message session-two containing a third locked short message, the locked short message session-two corresponding to preconfigured locking identification-two different from the preconfigured locking identification-one; and
display, in the short message display interface, an unlocked short message session containing an unlocked short message, wherein the short message display interface show the locked short message session-one and the locked short message session-two along with the unlocked short message session.

20. The non-transitory computer-readable storage medium according to claim 19, prior to obtaining the first locked short message, the processor is further configured to:
relocate a copy of the first short message from an unlocked storage area to a locked storage area; and
delete the first short message from the unlocked storage area.

* * * * *